United States Patent
Christensen et al.

[11] Patent Number: 5,905,727
[45] Date of Patent: May 18, 1999

[54] METHOD AND SYSTEM FOR TRANSMITTING ATM CELLS ON AN ATM LINK

[75] Inventors: Kenneth J. Christensen, Tampa, Fla.; Lee C. Haas, Raleigh, N.C.

[73] Assignee: International Business Machines Corporation, Armonk, N.Y.

[21] Appl. No.: 08/728,294

[22] Filed: Oct. 8, 1996

[51] Int. Cl.[6] ........................................... H04J 3/14
[52] U.S. Cl. ........................................... 370/395
[58] Field of Search ........................ 570/389, 392, 570/395, 393, 394, 396, 397, 398, 399, 400, 410, 465, 469, 470, 471, 472, 473, 474, 475, 476, 477, 522

[56] References Cited

U.S. PATENT DOCUMENTS

| | | | |
|---|---|---|---|
| 4,704,606 | 11/1987 | Hasley | 340/825.5 |
| 5,159,591 | 10/1992 | Gohara et al. | |
| 5,214,639 | 5/1993 | Herion | |
| 5,323,395 | 6/1994 | Henrion | |
| 5,440,547 | 8/1995 | Easki et al. | 370/397 |
| 5,530,698 | 6/1996 | Kozaki et al. | 370/412 |
| 5,583,859 | 12/1996 | Feldmeier | 370/471 |
| 5,606,558 | 2/1997 | Daniel et al. | 370/474 |

FOREIGN PATENT DOCUMENTS

| | | | |
|---|---|---|---|
| 0545340 | 6/1993 | European Pat. Off. | H04Q 11/00 |

*Primary Examiner*—Huy D. Vu
*Attorney, Agent, or Firm*—Joscelyn G. Cockburn

[57] ABSTRACT

Disclosed is a method of transmitting ATM cells from a sending unit to a receiving unit on an ATM link wherein each of the ATM cells includes a header portion and a data portion. In the sending unit, a header portion is identified which is common to a set of subsequent ATM cells. Then, the common header portion is transmitted from the sending unit to the receiving unit followed by all data portions of the set of subsequent ATM cells. In the receiving unit, the original set of subsequent ATM cells is generated by using the common header portion.

33 Claims, 7 Drawing Sheets

METHOD AND SYSTEM FOR TRANSMITTING ATM CELLS ON AN ATM LINK

FIELD OF THE INVENTION

The invention concerns a method and a system for transmitting ATM cells from a sending unit to a receiving unit on an ATM link wherein each of said ATM cells includes a header portion and a data portion. As well, the invention concerns a method and a system for sending ATM cells to an ATM link and a method and a system for receiving ATM cells from an ATM link.

DESCRIPTION OF THE PRIOR ART

A transmission of digital information from a sending unit to a receiving unit using the Asynchronous Transfer Mode (ATM) includes the transmission of a fixed number of consecutive bits grouped in so-called ATM cells on an ATM link. Each cell is partitioned into a header portion of bits and a data portion of bits. Usually, the header portion is built up of 5 bytes and the data portion of 48 bytes. The header portion carries non-data information which relates to the ATM transmission. In particular, the header portion includes addressing information pertaining to the receiving unit where the accompanying data portion has to be sent to. The data portion carries that information that has to be sent from the sending unit to the receiving unit, i.e. usually the user data.

During an ATM transmission, the respective ATM cells are sent over the ATM link continuously without interruption and without changing the sequence of the ATM cells. When there is no information to be sent, so-called empty ATM cells are sent over the ATM link which only carry some kind of service data.

Often, a large amount of information has to be sent from one and the same sending unit to one and the same receiving unit. In this case, the information is segmented into many ATM cells which are then transmitted over the ATM link. All these ATM cells have the same header portion. An example is the emulation of a Local Area Network (LAN) using ATM transmission where the large LAN packets are segmented into many ATM cells, each of these ATM cells having the same header portion. All these identical header portions are then transmitted over the ATM link, each of them accompanied by the respective data portion. Apparently, such repeated transmissions of identical header portions are a waste of performance and should therefore be eliminated.

U.S. Pat. No. 5,323,395 relates to a method and a system for transmitting information over an ATM link using ATM. The described method deviates from the conventional ATM transmission in that it uses variable length blocks instead of fixed length cells. Each of these blocks may be a data block or an empty block. Each data block comprises a header sub-block and at least one data sub-block and each empty block comprises an empty sub-block. The length of the three different sub-blocks may be different with the consequence that the length of different blocks may also be different. A large amount of information with the same destination is then converted into a data block with only one header sub-block carrying the destination and many data sub-blocks carrying the information to be transmitted. As a result, no redundant transmission of the destination occurs. However, as already mentioned, due to the variable length of the transmitted blocks, the described method and system is not applicable in connection with a conventional ATM switching.

U.S. Pat. No. 4,704,606 relates to a variable length packet switching system including a bus with a number of ports. Using such variable length packets, a technique has to be implemented for keeping that information together which belongs to one and the same packet and which therefore has to be sent to one and the same destination. As an example, the beginning and the end of the packet may be marked for that purpose. The described system provides a so-called end-of-packet bit which is recognized by the switching system and which then signals that the bus is free to accept a packet from another port. As already mentioned, the described system relates to packet switching and is therefore not applicable in connection with a conventional ATM switching.

OBJECTS OF THE INVENTION

It is an object of the invention to increase the transmission capability of an ATM transmission on an ATM link.

It is another object of the invention to provide a method and a system for transmitting ATM cells from a sending unit to a receiving unit on an ATM link with greater throughput and improved performance.

It is another object of the invention to provide a method and a system for sending ATM cells to an ATM link and a method and a system for receiving ATM cells from an ATM link with greater throughput and improved performance.

SUMMARY OF THE INVENTION

These and other objects are solved according to the invention by a method and a system for transmitting ATM cells from a sending unit to a receiving unit on an ATM link wherein each of said ATM cells includes a header portion and a data portion. As well, these and other objects are solved according to the invention by a method and a system for sending ATM cells to an ATM link and a method and a system for receiving ATM cells from an ATM link.

According to an aspect of the invention the transmitting method comprises the steps of, in the sending unit, identifying a header portion which is common to a set of subsequent ATM cells, transmitting from the sending unit to the receiving unit the common header portion and then all data portions of the set of subsequent ATM cells, and, in the receiving unit, generating the original set of subsequent ATM cells by using the common header portion.

The identification of the set of subsequent ATM cells with a common header portion has the advantage that all these ATM cells may be linked together and processed in common. According to the invention, this is done by transmitting the common header portion of all these ATM cells only once and then transmitting all data portions of the set of subsequent ATM cells and by rebuilding the original ATM cells by using the common header portion. As a result, the common header portion is not repeated and therefore no redundant information is transmitted over the ATM link. This has the advantage that a greater throughput on the ATM link is gained and the performance of the ATM transmission is improved.

As described, a conventional ATM cell includes a 5 bytes header portion and a 48 bytes data portion. On this basis of 53 bytes per ATM cell, the invention reduces the ATM transmission by the 5 bytes header portion per every subsequent ATM cell. This corresponds to a 10 percent reduction of non-data overhead per ATM cell. Thus, the advantage of an increased transmission capability of the ATM transmission is apparent.

According to an aspect of the invention a transmitting system comprises means for identifying a header portion which is common to a set of subsequent ATM cells. Furthermore, the system comprises means for generating the original set of subsequent ATM cells by using said common header portion. After the identification of the common header portion, this header portion is sent only once with all the data portions of the set of subsequent ATM cells to follow. In order to rebuild the original ATM cells, the common header portion is inserted into the stream of received information. As a result, it is possible to transmit a set of subsequent ATM cells which has to be sent to the same destination with a minimum of non-data overhead. The common header portion has to be sent only once with the consequence that the throughput of the ATM transmission increases.

According to an aspect of the invention a first sending method comprises the steps of checking the header portion of the ATM cell to be sent whether it is the same as a previously stored header portion or not, and if it is not the same as the previously stored header portion, storing the header portion of the ATM cell and sending a cell delimiter, the header portion and the data portion of the ATM cell, or if it is the same as the previously stored header portion, removing the header portion of the ATM cell and sending a block delimiter and the data portion of the ATM cell only.

The cell delimiter and the block delimiter are used for the differentiation of complete ATM cells and incomplete ATM cells. Complete ATM cells, i.e. ATM cells including a header portion and a data portion, are marked with the cell delimiter, and incomplete ATM cells, i.e. ATM cells with a data portion only, are marked with the block delimiter. Furthermore, the header portion is stored after a change. These features help to avoid the repetition of common header portions including the same destination which has the described advantage of a greater throughput on the ATM link.

According to an aspect of the invention a first receiving method comprises the steps of checking each of the received header and data portions for a cell delimiter or a block delimiter, and if it is a cell delimiter, generating the ATM cell by using the header and data portion accompanying the cell delimiter and storing the header portion, or if it is a block delimiter, generating the ATM cell by using the previously stored header portion and the data portion accompanying the block delimiter.

The cell delimiter and the block delimiter are used to identify whether the received information is a complete ATM cell or an incomplete ATM cell. Furthermore, the stored header portion is used in the case of a block delimiter and is inserted into the stream of received information. As a result, it is possible to rebuild the original ATM cells and to use them as conventional ATM cells.

According to an aspect of the invention a second sending method comprises the steps of checking the header portion of the ATM cell to be sent whether it is the same as a previously stored header portion or not, and if it is not the same as the previously stored header portion, storing the header portion of the ATM cell and sending a start delimiter, the header portion and the data portion of the ATM cell, or if it is the same as the previously stored header portion, removing the header portion of the ATM cell and sending the data portion of the ATM cell only.

The start delimiter is used to mark the beginning of a set of subsequent ATM cells with the same destination. The start delimiter is followed by the common header portion for all these ATM cells. After the header portion, all the data portions of the ATM cells are sent without a repetition of the common header portion and without any further delimiter. Thereby, the transmission of redundant header portions is avoided and the throughput on the ATM transmission is increased.

According to an aspect of the invention a second receiving method comprises the steps of checking each of the received header and data portions for a start delimiter, and if the start delimiter is present, generating the ATM cell by using the header and data portion accompanying the start delimiter, and storing the header portion, or if the start delimiter is not present, generating the ATM cell by using the previously stored header portion and the respective data portion.

The start delimiter is used to identify the common header portion of the ATM cells and to store this common header portion. If a start delimiter is present, then the common header portion and the first data portion is used as the received ATM cell. If no start delimiter is present, the stored common header portion is inserted into the stream of received information and is used together with the respective data portion as the received ATM cell. As a result, it is possible to rebuild the original ATM cells and to use them as conventional ATM cells.

According to an aspect of the invention first and second sending and receiving systems comprise means for storing the header portion of one of the ATM cells. Such a header portion is always stored after a change of the header portion with the consequence that the actual header portion is always stored in the sending and the receiving system. If a number of subsequent ATM cells have the same header portion, this header portion is a common header portion and is therefore stored in the sending and the receiving system. With the stored header portion it is possible to identify a set of subsequent ATM cells which has to be sent to the same destination. In this case, the common header portion is only sent once and non-data symbols are sent as a mark. As well, it is possible to rebuild the original ATM cells by inserting the stored header portion into the stream of received information.

According to an aspect of the invention the first and the second sending and receiving systems comprise means for sending and receiving and identifying non-data symbols. The capability to identify non-data symbols enables the receiving systems to recognize when the stored common header portion has to be inserted into the stream of received information. Therefore, the non-data symbols provide the possibility to prevent sending the common header portion together with each of the set of subsequent ATM cells. Instead, the common header portion is sent only once together with non-data symbols which mark that this is the common header portion for the subsequent data portions.

DETAILED DESCRIPTION

The Asynchronous Transfer Mode (ATM) is a kind of packet transmission in which all packets have a fixed length standardized as 53 bytes. In such packet transmissions, a virtual connection is built up between the sending unit and the receiving unit prior to the actual transmission in a higher logical transmission layer. However, no permanent connection exists on a lower physical transmission layer between the sending unit and the receiving unit. Instead, each packet carries its destination with itself as a routing information.

This has the advantage that the actual transmission system may be used not only for the transmission of packets of one end user but for the transmissions of packets of different end users. These packets of different end user are multiplexed and then sent one after the other. Thereby, the actual transmission system may be used more effectively and the transmission capability is increased.

The actual transmission system includes a plurality of nodes which are connected by wires. In each of the nodes, the Asynchronous Transfer mode (ATM) is realized as an ATM transmission layer directly above the physical transmission layer. This ATM transmission layer is independent of the physical transmission layer. It includes functions like the generation and extraction of the destination of the packets, multiplexing and demultiplexing packets, and so on. The physical transmission layer includes those functions which are necessary to transmit the information generated in the ATM transmission layer on the actual transmission system, i.e. on the wires between the nodes.

Above the ATM transmission layer exists another layer which adapts the ATM transmission layer to the higher logical transmission layers. In particular, this adapting layer translates the above mentioned virtual connection of the higher logical transmission layers into routing information for the ATM transmission layer.

As described, the packets used in the Asynchronous Transfer Mode (ATM) have a fixed length. According to ATM conventions, each of these so-called ATM cells has a length of 53 bytes and is partitioned into a header portion of 5 bytes and a data portion of 48 bytes. The header portion carries so-called non-data information, in particular the above mentioned routing information of the destination of the ATM cell. The data portion carries the information which an end user wants to sent to this destination. If information has to be sent from a sending unit to a receiving unit and if such information is very large, the whole information is segmented into the necessary number of 48 bytes data portions and each of these data portions is accompanied by the 5 bytes header portion with the receiving unit as its destination.

The advantage of the described fixed length of each of the ATM cells is that it is not necessary for the switch to evaluate the length of an ATM cell. Furthermore, due to the relatively low number of bytes of one ATM cell, it is possible for the transmission system to multiplex ATM cells relating to the information of different end users very effectively and thereby to avoid very long delays in the case of the transmission of very large information of one of these end users.

The ATM cells are transmitted continuously from the sending unit to the receiving unit over the actual transmission system. The sequence of ATM cells relating to the information of one and the same end user does not change. The Asynchronous Transfer Mode (ATM) is asynchronous only in a sense that the recurrence of ATM cells containing information of one and the same end user is not necessarily periodic but may be asynchronous due to inserted ATM cells relating to information of another end user.

As long as information of one or more end users is transmitted, the ATM cells relating to this information are sent subsequently over the transmission system. If there is no more information available to be sent, the ATM transmission layer creates so-called empty ATM cells which are then inserted and sent over the transmission system. These empty ATM cells may carry service information for testing and maintaining the transmission system.

Figure 1:
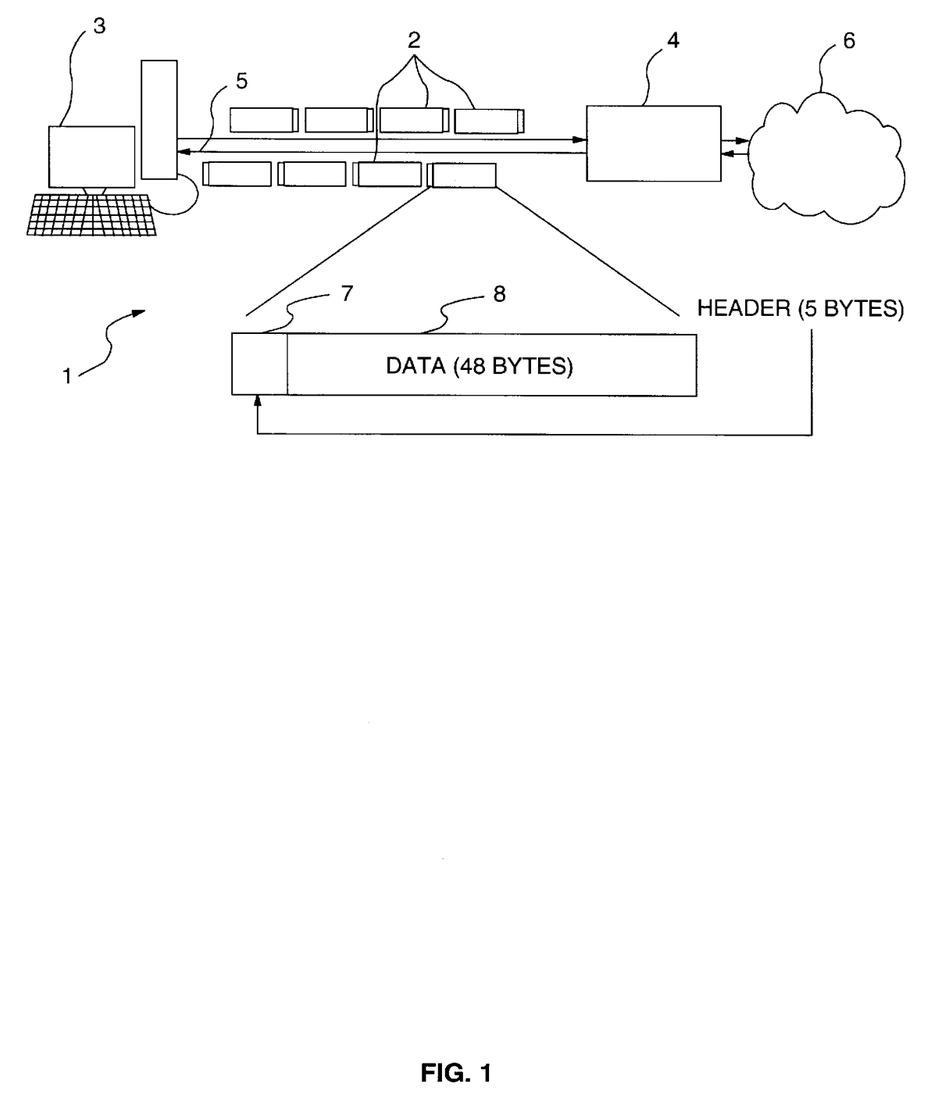
FIG. 1 shows a transmission system for transmitting ATM cells between an end user workstation and a switch according to the invention.

FIG. 1 shows a transmission system 1 for transmitting ATM cells 2 between an end user workstation 3 and a switch 4 or other devices. The ATM cells are transmitted over an ATM link 5 on which the ATM cells 2 may be transmitted in both directions. Furthermore, the switch 4 is coupled with a high speed network 6.

The end user workstation 3 is a conventional computer system which has coupling facilities for sending ATM cells 2 to the ATM link 5 and for receiving ATM cells 2 from the ATM link 5. The switch 4 is a conventional switching circuit including a number of ports which are all able to send and to receive ATM cells 2. One of these ports is connected with the ATM link 5 and another one of these ports is connected with the high speed network 6.

The high speed network 6 includes many switches like the switch 4 which are coupled over other ATM links to other end user workstations. All these switches are the nodes of the high speed network 6 and all the nodes are connected with other nodes by wires. As a result, it is possible to transmit information between the end user workstation 3 and another end user workstation which is coupled to the high speed network 6.

Each of the ATM cells 2 conventionally includes 53 bytes partitioned into a header portion 7 of 5 bytes followed by a data portion 8 of 48 bytes. The header portion 7 carries the destination of the respective ATM cell 2 and the data portion 8 carries the information which has to be transmitted to this destination. All ATM cells 2 follow each other subsequently.

Most of the ATM cells 2 on the wires of the high speed network 6 usually have different destinations. For example, it is possible that ATM cells 2 for a first end user workstation as well as ATM cells 2 for a second end user workstation are transmitted in the same direction over a particular wire from one node to another node of the high speed network 6. In this case, it is possible that the ATM cells 2 with the different destinations are multiplexed on this particular wire of the high speed network 6. This depends on the number of ATM cells 2 to be transmitted over this particular wire. However, the sequence of the ATM cells 2 with the same destination is not changed.

Figure 2:
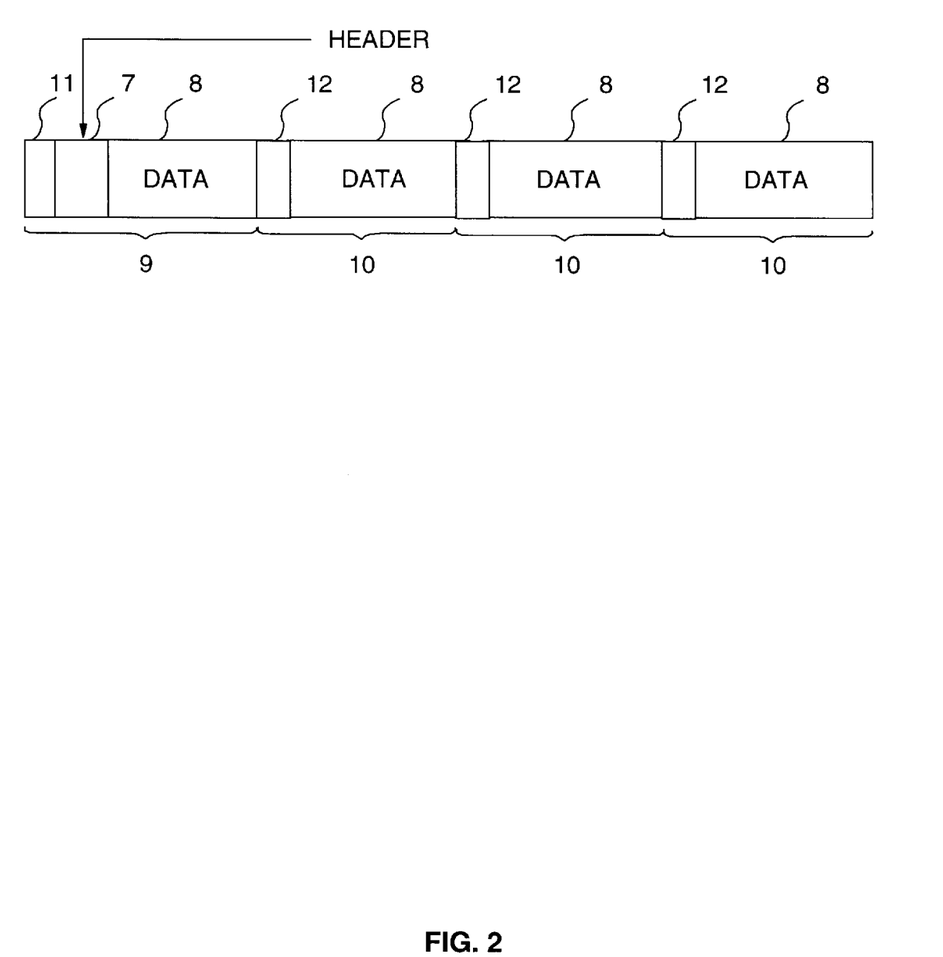
FIG. 2 shows a set of subsequent ATM cells according to a first embodiment of the invention.

FIG. 2 shows a set of subsequent ATM cells 9, 10 according to a first embodiment of the invention. The ATM cells 9, 10 of FIG. 2 are different from the ATM cells 2 of FIG. 1. The ATM cell 9 of FIG. 2 comprises a cell delimiter 11 followed by the 5 bytes header portion 7 and the 48 bytes data portion 8. With regard to the header portion 7, the ATM cell 9 is complete. Each of the ATM cells 10 of FIG. 2 comprises a block delimiter 12 followed by the 48 bytes data portion 8. The ATM cells 10 do not include any header portion. Insofar, the ATM cells 10 are incomplete.

The cell delimiter 11 and the block delimiter 12 are so-called non-data symbols, i.e. they do not carry any data information. Instead, they represent whether the ATM cells 9, 10 are complete or incomplete with regard to the header portion 7. The cell delimiter 11 is a mark for the completeness of the ATM cell 9 and the block delimiter 12 is a mark for the incompleteness of the ATM cell 10 as it does not include the header portion 7.

The ATM cell 9 consisting of the preceding cell delimiter 11, the header portion 7 and the data portion 8 is followed by the ATM cells 10 each consisting of the preceding block delimiter 12 and the data portion 8. Such a set of subsequent ATM cells 9, 10 may be followed by further sets of subsequent ATM cells 9, 10. Each of the sets of subsequent ATM cells 9, 10 must include necessarily the complete ATM cell 9 with the cell delimiter 11, the header portion 7 and the data portion 8, and may additionally include one or more of the incomplete ATM cells 10 with the block delimiter 12 and the data portion 8.

All ATM cells 9, 10 of the set of subsequent ATM cells 9, 10 shown in FIG. 2 are directed to the destination which is included in the header portion 7 of the ATM cell 9. This means that not only the data portion 8 of the ATM cell 9 has to be sent to the destination defined by the respective header portion 7 of this ATM cell 9, but also the data portions 8 of the subsequent ATM cells 10 have to be sent to the destination defined by the header portion 7 of the ATM cell 9.

As the ATM link 5 connects the end user workstation 3 and the switch 4, it is only possible that information is transmitted from the switch 4 to the end user workstation 3 or vice versa. If a set of subsequent ATM cells 9, 10 is sent over the ATM link 5 the header portion 7 of the ATM cell 9 may therefore either define the end user workstation 3 or the switch 4 as destination. A multiplexing of ATM cells as described in connection with the conventional ATM cells 2 of FIG. 1 is not possible on the ATM link 5.

The set of subsequent ATM cells 9, 10 shown in FIG. 2 is particularly suitable for this situation on the ATM link 5 as it avoids the unnecessary repetition of header portions 7 with the same destination. The set of subsequent ATM cells 9, 10 advantageously includes the header portion 7 only once and this header portion 7 is used as the destination of all following data portions 8.

Figure 3:
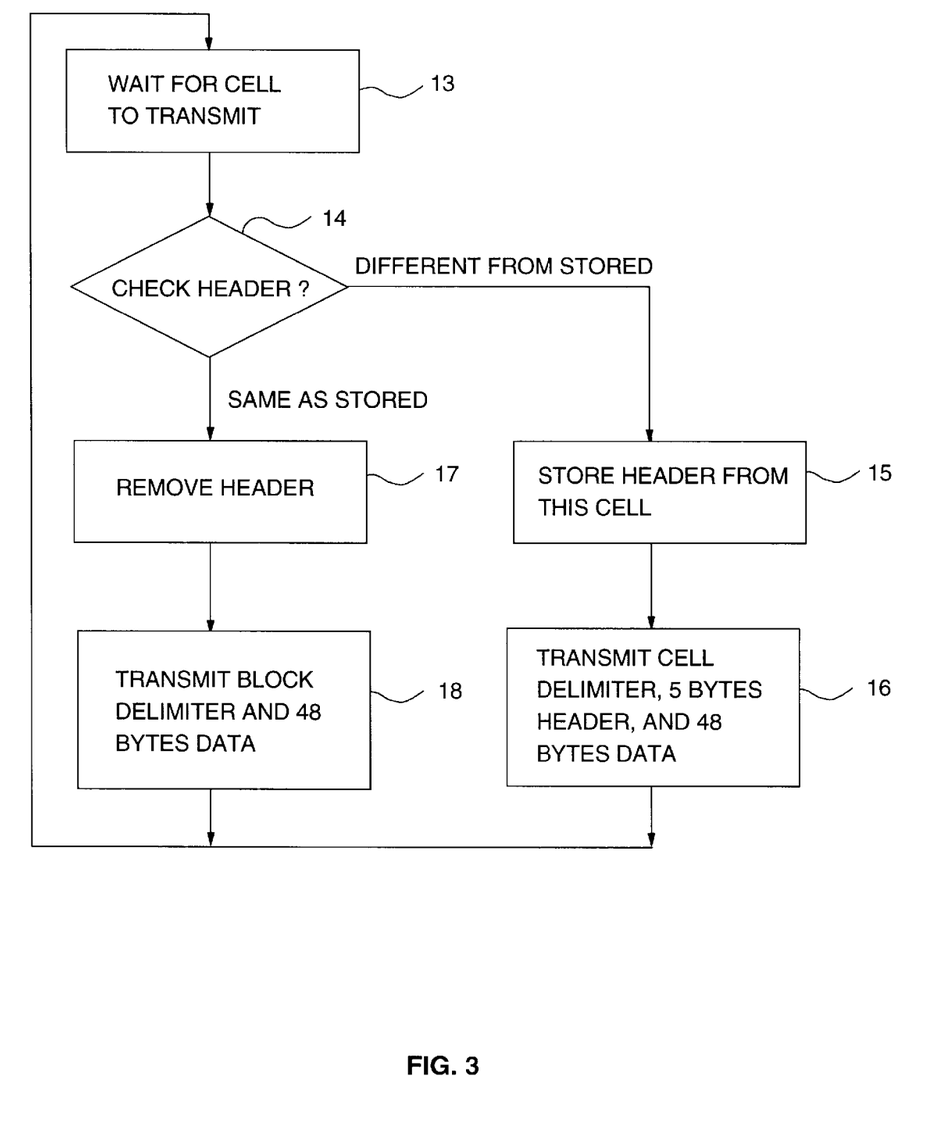
FIG. 3 shows a flowchart of a sending method according to the first embodiment of FIG. 2.

FIG. 3 shows a flowchart of a sending method according to the first embodiment of FIG. 2. This method creates the set of subsequent ATM cells 9, 10 as described in connection with FIG. 2 out of a number of conventional ATM cells 2 as described in connection with FIG. 1. The method of FIG. 3 is applied to conventional ATM cells 2 in the end user workstation 3 and in the switch 4 prior to their transmission over the ATM link 5.

In a first step 13, the method shown in FIG. 3 waits for a conventional ATM cell 2 to be transmitted over the ATM link 5. If such an ATM cell 2 is detected, the header portion 7 of this ATM cell 2 is checked in step 14.

If the header portion 7 is different from a previously stored header portion, then the current header portion 7 of the checked ATM cell 2 is stored in step 15 thereby replacing the above mentioned previously stored header portion.

After this storing step, the cell delimiter 11, the current header portion 7 and the current data portion 8 are transmitted over the ATM link 5 in step 16. This corresponds to the transmission of the complete ATM cell 9 of FIG. 2 over the ATM link 5. The method then continues with step 13.

If, in step 14, the header portion 7 is the same as a previously stored header portion, then the current header portion 7 is removed in step 17. Then, in step 18, the block delimiter 12 and the current data portion 8 are transmitted over the ATM link 5. This corresponds to the transmission of one of the incomplete ATM cells 10 of FIG. 2 over the ATM link 5. The method then continues with step 13.

It is now assumed that four subsequent conventional ATM cells 2 shall be transmitted over the ATM link 5 to the same destination. These four ATM cells 2 therefore have the same header portion 7. Furthermore, it is assumed, that this destination is different from a former destination.

In this case, the method shown in FIG. 3 has to be processed four times. In the first loop, the header portion 7 of the first conventional ATM cell 2 to be transmitted is different from the previously stored header portion. Therefore, this stored header portion is replaced by the current header portion 7 according to step 15 and the cell delimiter 11, the current header portion 7 and the current data portion 8 are transmitted over the ATM link 5 according to step 16. In the subsequent three loops, the header portions of the respective conventional ATM cells 2 are the same as the stored header portion. Therefore, the respective current header portions 7 are removed according to step 17 and the block delimiter 12 and the respective data portions 8 are transmitted over the ATM link 5 according to step 18.

Summarized, the complete ATM cell 9 is transmitted once according to steps 15, 16 and the three incomplete ATM cells 10 are transmitted one after the other according to steps 17, 18. As a result, the four conventional ATM cells 2 are transmitted as the set of subsequent ATM cells 9, 10 shown in FIG. 2 over the ATM link 5. A repetition of identical header portions 7 is avoided and the performance of the transmission is thereby increased.

Figure 4:
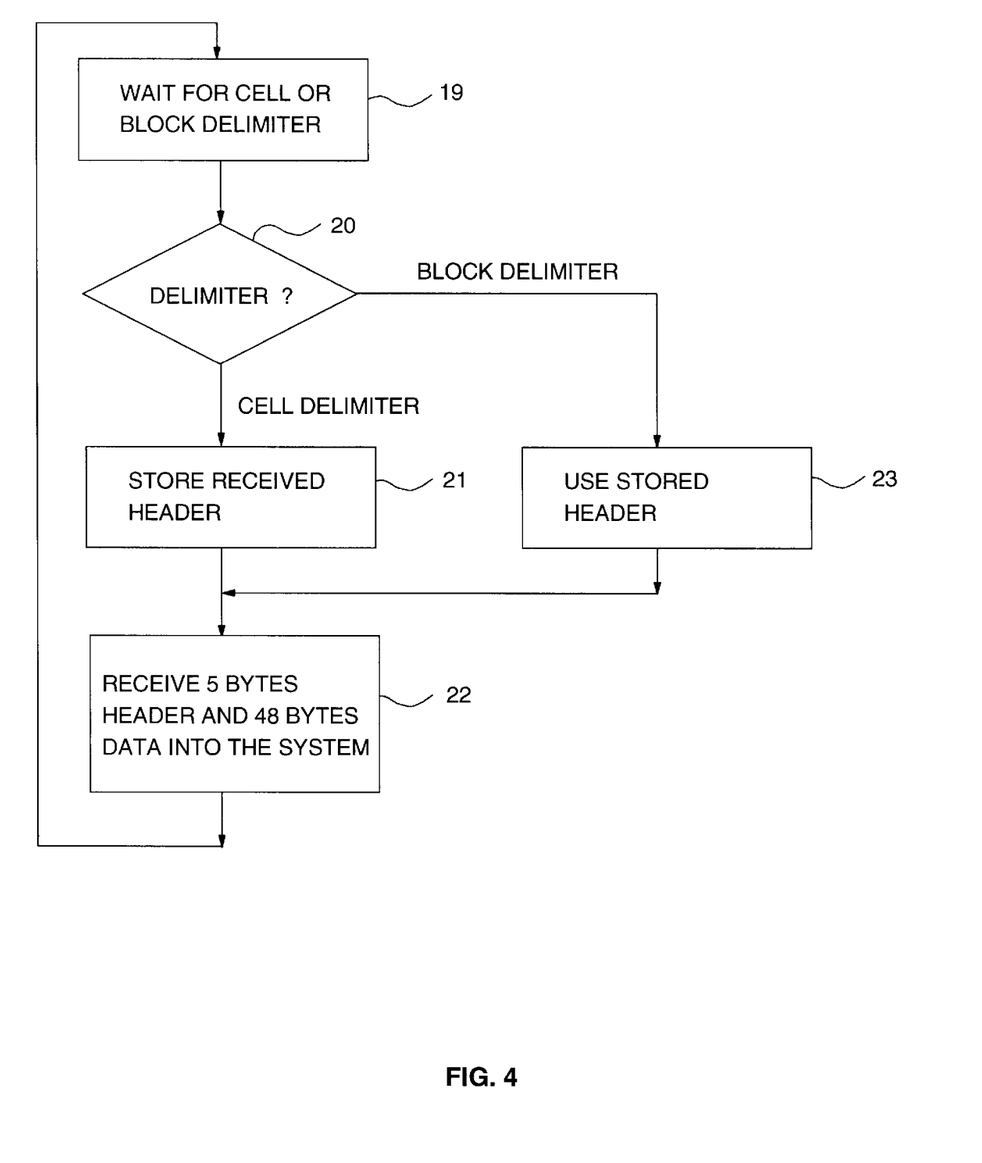
FIG. 4 shows a flowchart of a receiving method according to the first embodiment of FIG. 2.

FIG. 4 shows a flowchart of a receiving method according to the first embodiment of FIG. 2. This method creates a number of conventional ATM cells 2 as described in connection with FIG. 1 out of the set of subsequent ATM cells 9, 10 as described in connection with FIG. 2. The method of FIG. 4 is applied to ATM cells 9, 10 received in the end user workstation 3 and in the switch 4.

In a first step 19, the method shown in FIG. 4 waits for an ATM cell 9, 10 received from the ATM link 5. If such an ATM cell 9, 10 is detected, it is checked in step 20 whether the received ATM cell 9, 10 is accompanied by the cell delimiter 11 or the block delimiter 12.

If the cell delimiter 11 is detected, the received current header portion 7 is stored in step 21 thereby replacing a previously stored header portion. Then, this current header portion 7 and the current data portion 8 are used as the received information and for further processing according to steps 22.

If the block delimiter 12 is detected, the previously stored header portion is inserted into the stream of information according to step 23. Then, this previously stored header portion and the received current data portion 8 are used as the received information and for further processing according to step 22. After step 22, the method continues with step 19.

It is now assumed that the set of subsequent ATM cells 9, 10 shown in FIG. 2 is transmitted over the ATM link 5.

In this case, the method shown in FIG. 4 has to be processed four times. In the first loop, the cell delimiter 11 is detected and, therefore, the received current header portion 7 of the first ATM cell 9 of the set of subsequent ATM cells 9, 10 to be received is stored according to step 21. Then, this current header portion 7 and the current data portion 8 is received and used as conventional ATM cell 2 for further processing according to step 22. In the subsequent three loops, the block delimiter 12 is detected, respectively. Therefore, the previously stored header portion is used as the respective current header portions 7 of the ATM cells 10 according to step 23 and the previously stored header portion and the respective current data portion 8 of the ATM cells 10 are subsequently used as conventional ATM cells 2 for further processing according to step 22.

Summarized, the complete ATM cell 9 is used as conventional ATM cell 2 according to steps 21, 22 and then the three incomplete ATM cells 10 are rebuilt into conventional ATM cells 2 according to steps 23, 22 one after the other. As a result, the set of subsequent ATM cells 9, 10 shown in FIG. 2 are received and rebuilt as conventional ATM cells 2.

Figure 5:
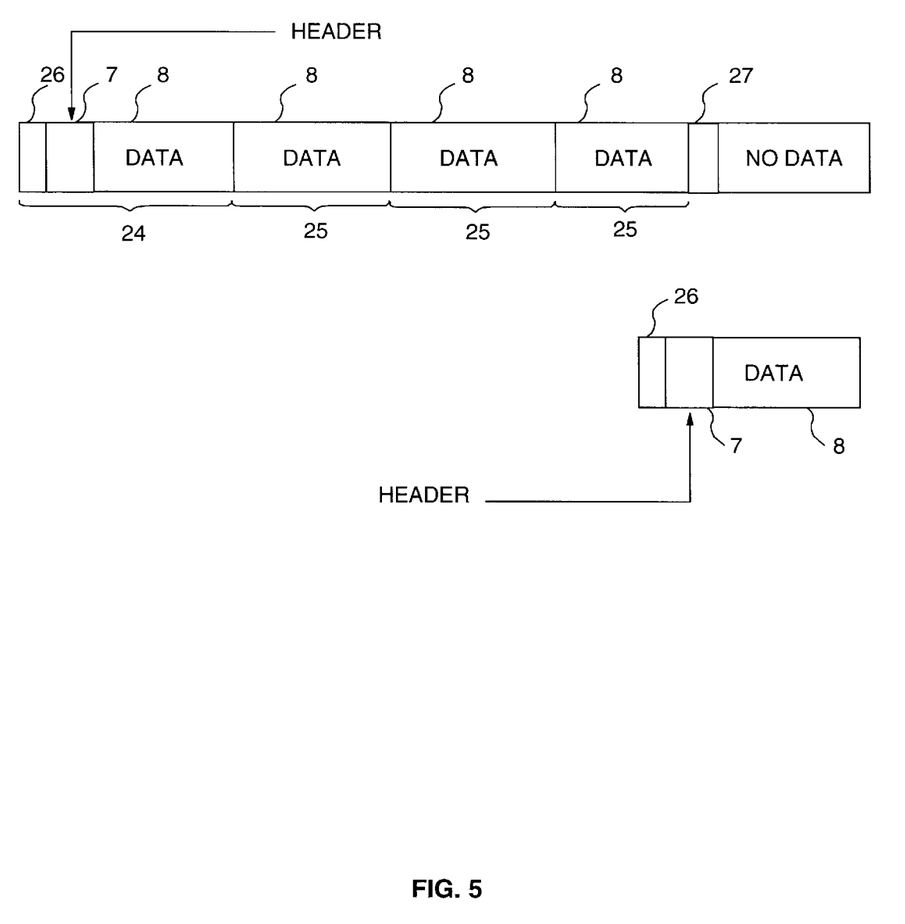
FIG. 5 shows a set of subsequent ATM cells according to a second embodiment of the invention.

FIG. 5 shows a set of subsequent ATM cells 24, 25 according to a second embodiment of the invention. The ATM cells 24, 25 of FIG. 5 are different from the ATM cells 2 of FIG. 1. The ATM cell 24 of FIG. 5 comprises a start delimiter 26 followed by the 5 bytes header portion 7 and the 48 bytes data portion 8. The ATM cells 25 of FIG. 5 include the 48 bytes data portion 8 each. However, the ATM cells 25 do not include any header portion. The ATM cells 25 are followed by an end delimiter 27 or by the start delimiter 26 of the next set of subsequent ATM cells 24, 25.

The start delimiter 26 and the end delimiter 27 are so-called non-data symbols, i.e. they do not carry any data information. Instead, they represent the beginning and the end of the set of subsequent ATM cells 24, 25. The start delimiter 26 is a mark for the beginning of the ATM cell 24 and the end delimiter 27 is a mark for the end of the last one of the ATM cells 25.

The ATM cell 24 consisting of the preceding start delimiter 26, the header portion 7 and the data portion 8 is followed by the ATM cells 25 each consisting of the data portion 8 only and being followed by the end delimiter 27. Such a set of subsequent ATM cells 24, 25 may be followed by further sets of subsequent ATM cells 24, 25. If the next set of subsequent ATM cells 24, 25 does not continuously follow the previous set of subsequent ATM cells 24, then it is necessary to use the end delimiter 27 as described. However, if a set of subsequent ATM cells 24, 25 is continuously followed by another set of subsequent ATM cells 24, 25, then the end delimiter 27 is not necessary. In this case, the start delimiter 26 of the next set of subsequent ATM cells 24, 25 is not only a mark for the beginning of this next set of subsequent ATM cells 24, 25, but it is also a mark for the end of the last set of subsequent ATM cells 24, 25.

Each of the sets of subsequent ATM cells 24, 25 must include necessarily the first ATM cell 24 with the start delimiter 26, the header portion 7 and the data portion 8, and may additionally include one or more of the ATM cells 25 with the data portions 8 and, if need be, the final end delimiter 27.

All ATM cells 24, 25 of the set of subsequent ATM cells 24, 25 shown in FIG. 5 are directed to the destination which is included in the header portion 7 of the ATM cell 24. This means that not only the data portion 8 of the ATM cell 24 has to be sent to the destination defined by the respective header portion 7 of this ATM cell 24, but also the data portions 8 of the subsequent ATM cells 25 have to be sent to the destination defined by the header portion 7 of the ATM cell 24.

As the ATM link 5 connects the end user workstation 3 and the switch 4, it is only possible that information is transmitted from the switch 4 to the end user workstation 3 or vice versa. If a set of subsequent ATM cells 24, 25 is sent over the ATM link 5 the header portion 7 of the ATM cell 24 may therefore either define the end user workstation 3 or the switch 4 as destination. A multiplexing of ATM cells as described in connection with the conventional ATM cells 2 of FIG. 1 is not possible on the ATM link 5.

The set of subsequent ATM cells 24, 25 shown in FIG. 5 is particularly suitable for this situation on the ATM link 5 as it avoids the unnecessary repetition of header portions 7 including the same destination. The set of subsequent ATM cells 24, 25 advantageously includes the header portion 7 only once and this header portion is used as the destination of all following data portions 8.

Figure 6:
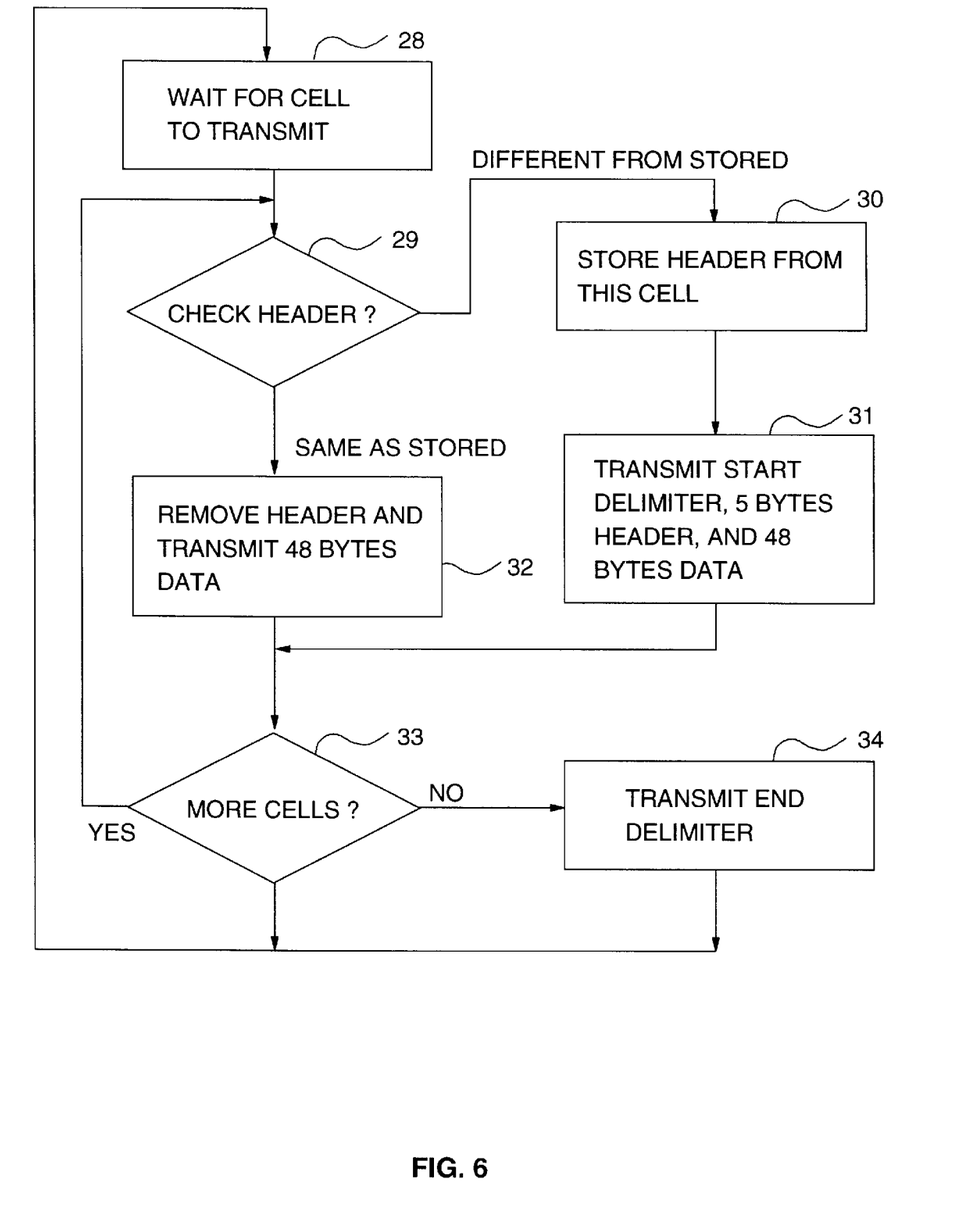
FIG. 6 shows a flowchart of a sending method according to the second embodiment of FIG. 5.

FIG. 6 shows a flowchart of a sending method according to the second embodiment of FIG. 5. This method creates the set of subsequent ATM cells 24, 25 as described in connection with FIG. 5 out of a number of conventional ATM cells 2 as described in connection with FIG. 1. The method of FIG. 6 is applied to conventional ATM cells 2 in the end user workstation 3 and in the switch 4 prior to their transmission over the ATM link 5.

In a first step 28, the method shown in FIG. 6 waits for a conventional ATM cell 2 to be transmitted over the ATM link 5. If such an ATM cell 2 is detected, the header portion 7 of this ATM cell 2 is checked in step 29.

If the header portion 7 is different from a previously stored header portion, then the current header portion 7 of the checked ATM cell 2 is stored in step 30 thereby replacing the mentioned previously stored header portion.

After this storing step, the start delimiter 26, the current header portion 7 and the current data portion 8 are transmitted over the ATM link 5 in step 31. This corresponds to the transmission of the first ATM cell 24 of FIG. 5 over the ATM link 5.

If, in step 29, the header portion 7 is the same as the previously stored header portion, then the current header portion 7 is removed in step 32 and the current data portion 8 is transmitted over the ATM link 5. This corresponds to the transmission of one of the ATM cells 25 of FIG. 5 over the ATM link 5.

After step 31 and step 32, the method continues with step 33.

In step 33 it is checked whether more ATM cells 24, 25 are received. If no further ATM cell 24, 25 is received, then the end delimiter 27 is transmitted in step 34 after the last ATM cell 25 and the method continues with step 28 as already described. If further ATM cells 24, 25 are detected, then the method continues with step 29.

It is now assumed that four subsequent conventional ATM cells 2 shall be transmitted over the ATM link 5 to the same destination. These four ATM cells 2 therefore have the same header portion 7. Furthermore, it is assumed, that this destination is different from a former destination.

In this case, the method shown in FIG. 6 has to be processed four times. In the first loop, the header portion 7 of the first conventional ATM cell 2 to be transmitted is different from the header portion previously stored. Therefore, this previously stored header portion is replaced by the current header portion 7 according to step 30 and the start delimiter 26, the current header portion 7 and the current data portion 8 are transmitted over the ATM link 5 according to step 31. In the subsequent three loops, the header portions of the respective conventional ATM cells 2 are the same as the stored header portion. Therefore, the respective current header portions 7 are removed and the respective data portions 8 are transmitted over the ATM link 5 according to step 32.

Then, if no further ATM cells 24, 25 are detected, the end delimiter 27 is transmitted over the ATM link 5 according to step 34. Otherwise, the start delimiter 26 of the next set of subsequent ATM cells 24, 25 is used as the mark for the end of the current set of subsequent ATM cells 24, 25.

Summarized, the first ATM cell 24 is transmitted once according to step 31 and the following three ATM cells 25 are transmitted one after the other according to step 32. As a result, the four conventional ATM cells 2 are transmitted as the set of subsequent ATM cells 24, 25 shown in FIG. 5 over the ATM link 5. A repetition of identical header portions 7 is avoided and the performance of the transmission is thereby increased.

Figure 7:
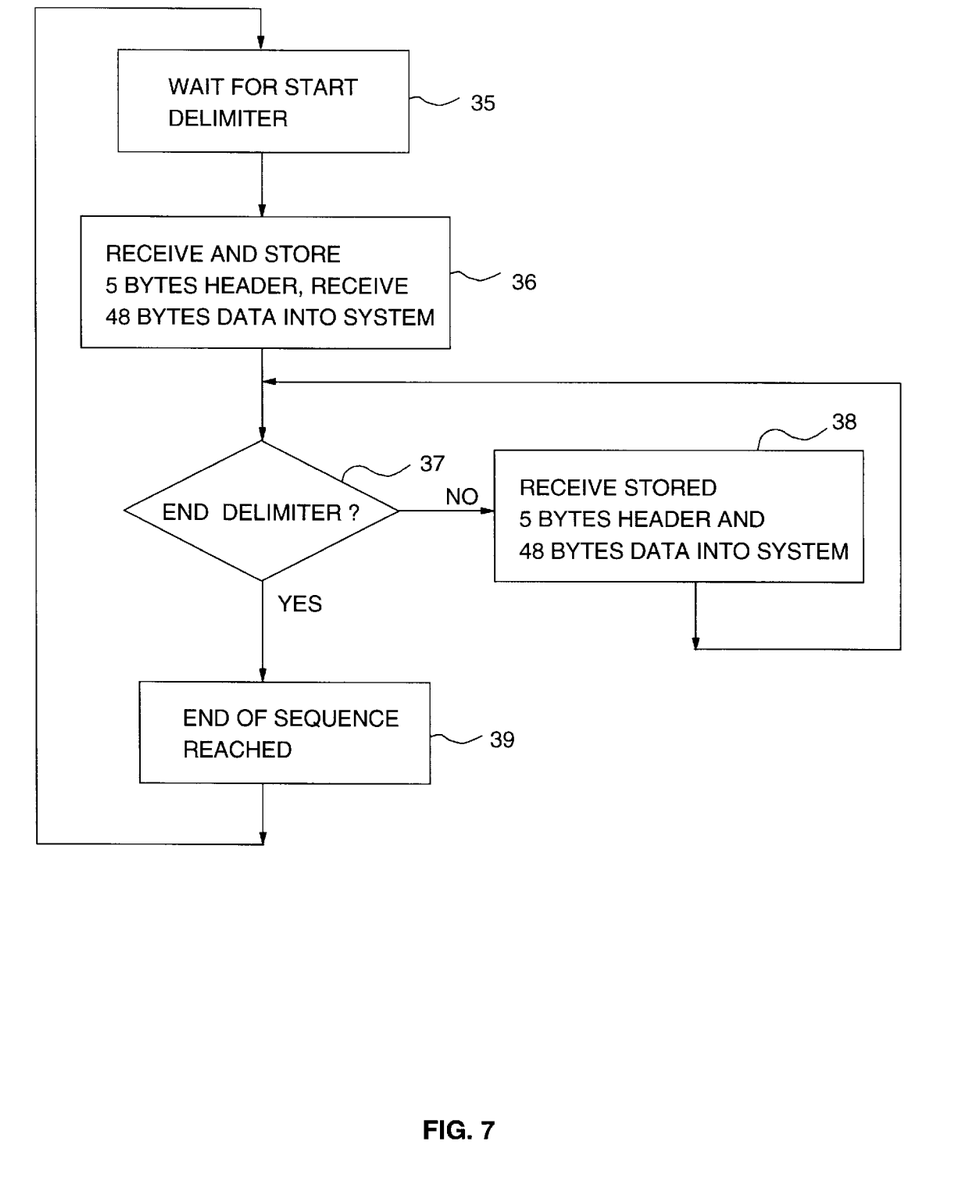
FIG. 7 shows a flowchart of a receiving method according to the second embodiment of FIG. 5.

FIG. 7 shows a flowchart of a receiving method according to the second embodiment of FIG. 5. This method creates a number of conventional ATM cells 2 as described in connection with FIG. 1 out of the set of subsequent ATM cells 24, 25 as described in connection with FIG. 5. The method of FIG. 7 is applied to ATM cells 24, 25 received in the end user workstation 3 and in the switch 4.

In a first step 35, the method shown in FIG. 7 waits for an ATM cell 24, 25 received from the ATM link 5. If such an ATM cell 24, 25 is detected, it is checked whether the received ATM cell 24, 25 is accompanied by the start delimiter 26.

If the start delimiter 26 is detected, the received current header portion 7 is stored in step 36. Then, this current header portion 7 and the current data portion 8 are used as the received information and for further processing according to steps 36.

Then, in step 37, it is checked whether the current data portion 8 is followed by the end delimiter 27. If there is no end delimiter 27 present, then the stored header portion together with the next respective data portion 8 is used as the received information and for further processing according to step 38. The method then continues with step 37.

However, if the end delimiter 27 is detected in step 37, then, according to step 39, the end of the set of subsequent ATM cells 24, 25 is reached and the method continues with step 35.

It is now assumed that the set of subsequent ATM cells 24, 25 shown in FIG. 5 is transmitted over the ATM link 5.

In this case, the method shown in FIG. 7 has to be processed four times. In the first loop, the start delimiter 26 is detected and, therefore, the received current header portion 7 of the first ATM cell 24 of the set of subsequent ATM cells 24, 25 to be received is stored according to step 36. Then, this current header portion 7 and the current data portion 8 is received and used as conventional ATM cell 2 for further processing according to step 36. In the subsequent three loops, the previously stored header portion is used as the respective current header portions 7 of the ATM cells 25 according to step 38 and the previously stored header portion and the respective current data portion 8 of the ATM cells 25 are subsequently used as conventional ATM cells 2 for further processing according to step 38.

Then, either the end delimiter 27 is detected or the start delimiter 26 of the next set of subsequent ATM cells 24, 25 is detected. In both cases, the end of the current set of ATM cells 24, 25 is reached.

Summarized, the first ATM cell 24 is received and used as conventional ATM cell 2 according to step 36 and the three incomplete ATM cells 25 are received and rebuilt into conventional ATM cells 2 one after the other according to step 38. As a result, the set of subsequent ATM cells 24, 25 shown in FIG. 5 are received and rebuilt as conventional ATM cells 2.

We claim:

1. A method of transmitting ATM cells from a sending unit to a receiving unit on an ATM link wherein each of said ATM cells includes a header portion and a data portion, said method comprising the steps of:

in said sending unit, identifying a header portion which is common to a set of ATM cells, transmitting from said sending unit to said receiving unit said common header portion and data portions only of said set of ATM cells;

in said receiving unit receiving the common header portion and data portions; and generating the original set of ATM cells by using said common header portion and the data portions.

2. The method of claim 1, further comprising the step of:

using a cell delimiter to mark a complete ATM cell including a header portion and a data portion.

3. The method of claim 2, further comprising the steps of:

in said sending unit:

checking the header portion of each of said ATM cells to be sent whether it is the same as a previously stored header portion or not, and if it is not the same as the previously stored header portion, storing the header portion of the respective ATM cell and sending said cell delimiter, the header portion and the data portion of the respective ATM cell, and in said receiving unit:

checking each of the received header and data portions for said cell delimiter, and if said cell delimiter is present, generating said original ATM cell by using the header and data portion accompanying said cell delimiter, and storing said header portion.

4. The method of claim 1, further comprising the step of:

using a block delimiter to mark an incomplete ATM cell including a data portion only.

5. The method of claim 4, further comprising the steps of:

in said sending unit:

checking the header portion of each of said ATM cells to be sent whether it is the same as a previously stored header portion or not, and if it is the same as the previously stored header portion, removing the header portion from the respective ATM cell and sending said block delimiter and the data portion of the respective ATM cell only, and in said receiving unit:

checking each of the received header and data portions for said block delimiter, and if said block delimiter is present, generating said original ATM cell by using the previously stored header portion and the data portion accompanying said block delimiter.

6. The method of claim 1, further comprising the step of:

using a start delimiter to mark said common header portion of said set of subsequent ATM cells.

7. The method of claim 6, further comprising the steps of:

in said sending unit:

checking the header portion of each of said ATM cells to be sent whether it is the same as a previously stored header portion or not, and if it is not the same as the previously stored header portion, storing the header portion of the respective ATM cell and sending said start delimiter, the header portion and the data portion of the respective ATM cell, or if it is the same as the previously stored header portion, removing the header portion of the respective ATM cell and sending the data portion of the respective ATM cell only, and in said receiving unit:

checking each of the received header and data portions for said start delimiter, and if said start delimiter is present, generating said original ATM cell by using the header and data portion accompanying said start delimiter, and storing said header portion, or if said start delimiter is not present, generating said original ATM cell by using the previously stored header portion and the respective data portion.

8. The method of claim 7, further comprising the step of:

using an end delimiter to mark the last data portion of said set of subsequent ATM cells.

9. The method of claim 8, further comprising the steps of:

in said sending unit:

checking whether further subsequent ATM cells have to be sent, and if no further subsequent ATM cells have to be sent, transmitting said end delimiter after the last data portion to be sent, and in said receiving unit:

checking each of the received header and data portions for said end delimiter, and if said end delimiter is present, recognizing that no further subsequent ATM cells will be received.

10. The method of claim 1 wherein said sending unit and said receiving unit each includes an ATM switch coupled to a computer system of an end user.

11. The method of claim 10 wherein said ATM switch is connected with a high speed network.

12. A method of sending an ATM cell to an ATM link wherein said ATM cell includes a header portion and a data portion, said method comprising the steps of:

checking the header portion of said ATM cell to be sent whether it is the same as a previously stored header portion or not, and if it is not the same as the previously stored header portion, storing the header portion of said ATM cell and sending a cell delimiter, the header portion and the data portion of said ATM cell, or if it is the same as the previously stored header portion, removing the header portion of said ATM cell and sending a block delimiter and the data portion of said ATM cell only.

13. A method of receiving an ATM cell from an ATM link wherein said ATM cell includes a header portion and a data portion, said method comprising the steps of:

checking each of the received header and data portions for a cell delimiter or a block delimiter, and if it is a cell delimiter, generating said ATM cell by using the header and data portion accompanying said cell delimiter and storing said header portion, or if it is a block delimiter, generating said ATM cell by using the previously stored header portion and the data portion accompanying said block delimiter.

14. The method of claim 12 or claim 13 wherein said cell delimiter and said block delimiter are non-data symbols.

15. A method of sending an ATM cell to an ATM link wherein said ATM cell includes a header portion and a data portion, said method comprising the steps of:

checking the header portion of said ATM cell to be sent whether it is the same as a previously stored header portion or not, and if it is not the same as the previously stored header portion, storing the header portion of said ATM cell and sending a start delimiter, the header portion and the data portion of said ATM cell, or if it is the same as the previously stored header portion, removing the header portion of said ATM cell and sending the data portion of said ATM cell only.

16. The method of claim 15, further comprising the steps of:

checking whether further subsequent ATM cells have to be sent, and if no further subsequent ATM cells have to be sent, transmitting an end delimiter after the last data portion to be sent.

17. A method of receiving an ATM cell from an ATM link wherein said ATM cell includes a header portion and a data portion, said method comprising the steps of:

checking each of the received header and data portions for a start delimiter, and if said start delimiter is present, generating said ATM cell by using the header and data portion accompanying said start delimiter, and storing said header portion, or if said start delimiter is not present, generating said ATM cell by using the previously stored header portion and the respective data portion.

18. The method of claim 17, further comprising the steps of:

checking each of said received data portions for an end delimiter, and if said end delimiter is present, recognizing that no further subsequent ATM cells will be received.

19. The method of claim 15 or claim 17 wherein said start delimiter is a non-data symbol.

20. The method of claim 16 or claim 18 wherein said end delimiter is a non-data symbol.

21. A system for transmitting ATM cells from a sending unit to a receiving unit on an ATM link wherein each of said ATM cells includes a header portion and a data portion, said system comprising:

means for identifying a header portion which is common to a set of ATM cells; and means for transmitting said header portion and the data portions only of said set of ATM cells.

22. The system of claim 21, further comprising:

means for generating the original set of subsequent ATM cells by using said common header portion and the data portions of said set of subsequent ATM cells.

23. The system of claim 21, further comprising:

means for generating an original set of ATM cells by using a common header portion and selected data portions from the original set of ATM cells.

24. A system for sending ATM cells to an ATM link wherein each of said ATM cells includes a header portion and a data portion, said system comprising:

means for identifying and storing a header portion that is common to a set of ATM cells; and means for transmitting the header portion and the data portions only of said set of ATM cells.

25. The system of claim 24, further comprising:

means for comparing said stored header portion with the header portion of a subsequent one of said ATM cells to identify ATM cells with a common header portion.

26. The system of claim 24, further comprising:

means for removing the header portion from each cell in the set of ATM cells.

27. The system of claim 24, further comprising:

means for sending non-data symbols.

28. A system for generating ATM cells from an ATM link wherein each of said ATM cells includes a header portion and a data portion, said system comprising:

means for receiving a header portion that is common to a set of ATM cells and the data portions only of said set of ATM cells;

a storage for storing the header portion and the data portions; and means for concatenating the header portion and respective ones of the data portions to generate ATM cells.

29. The system of claim 28, further comprising:

means for receiving and identifying non-data symbols.

30. The system of claim 29, further comprising:

means for removing said received and identified non-data symbols.

31. The system of claim 29, further comprising:

means for discarding said stored header portion after receipt of one of said non-data symbols.

32. The system of claim 27 or claim 29, wherein said non-data symbols are a cell delimiter and a block delimiter.

33. The system of claim 27 or claim 29, wherein said non-data symbols are a start delimiter and an end delimiter.

\* \* \* \* \*